United States
Langer et al.

[11] 3,829,210

[45] Aug. 13, 1974

[54] ILLUMINATING SYSTEM OF AN ENLARGER

[75] Inventors: Vojtech Langer, Prerov; Emil Nesvadba, Rokytnice u Prerova, both of Czechoslovakia

[73] Assignee: Meopta, narodni Podnik, Preov, Czechoslovakia

[22] Filed: Dec. 7, 1972

[21] Appl. No.: 314,000

[30] Foreign Application Priority Data
Dec. 10, 1971   Czechoslovakia ................. 8602-71

[52] U.S. Cl..................... 355/35, 350/188, 355/67, 355/71
[51] Int. Cl. ............................................ G03b 27/76
[58] Field of Search ............ 355/67, 71, 35, 36, 37, 355/38; 350/188, 211; 240/41.4 D

[56] References Cited
UNITED STATES PATENTS

| | | | |
|---|---|---|---|
| 66,453 | 1/1901 | Baird .................. | 350/188 |
| 2,040,613 | 5/1936 | Kuhn ................... | 240/41.4 D |
| 2,354,108 | 7/1944 | Fleming ............... | 355/35 |
| 3,146,661 | 9/1964 | Young .................. | 355/71 X |
| 3,157,087 | 11/1964 | Kaltenberg............ | 355/67 |
| 3,217,594 | 11/1965 | Simmons.............. | 355/35 X |
| 3,407,294 | 10/1968 | Hill ..................... | 355/67 X |
| 3,572,903 | 3/1971 | Hofmann .............. | 350/211 |

Primary Examiner—Samuel S. Matthews
Assistant Examiner—E. M. Bero
Attorney, Agent, or Firm—Murray Schaffer

[57] ABSTRACT

Illuminating system for a photographic enlarger for making color reproductions, consisting of a projection lamp with a spherical or an aspherical reflection mirror and of an enclosure for mixing colored light. The enclosure is provided with an input and an output ground glass window, between which a system of movable color correction filter is arranged. Between the projection lamp and the input window there is placed a dispersive optical assembly consisting of a system of optical prisms, whose optical axes are parallel with the axis of the illuminating system and perpendicular to the direction of movement of the color correction filters. The prisms are paired equidistant from the axis of the optical system, each pair having the same refractive power. A single prism is also provided, lying on the axis of the optical system, having a zero refractive power.

7 Claims, 2 Drawing Figures

ILLUMINATING SYSTEM OF AN ENLARGER

BACKGROUND OF THE INVENTION

The invention concerns the illuminating system of a photographic enlarger, and particularly of apparatus for making color reproductions and for correcting and controlling the color quality.

In making color reproductions, especially in making color reproductions both by subtractive and additive methods, it is inevitable that the color original (or negative) be uniformly illuminated over its entire surface by the light of the respective color. The problem of uniform distribution of light could easily be solved, if a surface light source would be available of at least the same size as that of the color original (negative), and the respective color filters would be placed in its immediate proximity.

In practice, however, a surface light source with a uniform luminous intensity over its whole surface is not known. There are used, however, light sources as for instance the opal lamp or projection lamp, in front of which is placed a dispersive member, generally a ground glass. In none of the above cases, however, is a uniform distribution and color of light attained and each results in a non-uniform coloration of the color original.

The object of the present invention therefore consists in providing such an illuminating system, in which by continuous movement of the color correction filters, a uniform illumination and coloration of the color original is attained.

These objects, others and numerous advantages will be apparent from the following disclosure.

SUMMARY OF THE INVENTION

According to the present invention an illuminating system for a color photographic enlarger, particularly for making color reproductions, comprises a projection lamp with a spherical or an aspherical reflecting mirror and of a mirror-box in which the colored light may be mixed. The mirror-box is provided with an input and an output ground glass, between which a system of color correction filters is movably arranged to be interposed in the light ray path.

Preferably, between the projection lamp and the input ground glass there is placed a dispersive optical lens system consisting of a lens member and of a plurality of optical wedges or prisms, each of whose optical axes are parallel with the central optical axis of the illuminating system and also perpendicular to the direction of movement of the color correction filters. Those corresponding optical wedges, being equally distant from the axis of the optical system have the same refractive power and the lens, lying on the axis of the optical system, has a zero refractive power. The number of optical prisms in the dispersive optical member is determined by the relation $S = m/v - 1$, where $S$ denotes the number of prisms, $m$ denotes the hieght of the input ground glass, and $v$ the height of the filament of the projection lamp.

Full details of the present invention are set forth in the following description of a preferred embodiment of the invention and will be seen from the accompanying drawings:

DESCRIPTION OF INVENTION

Figure 1:
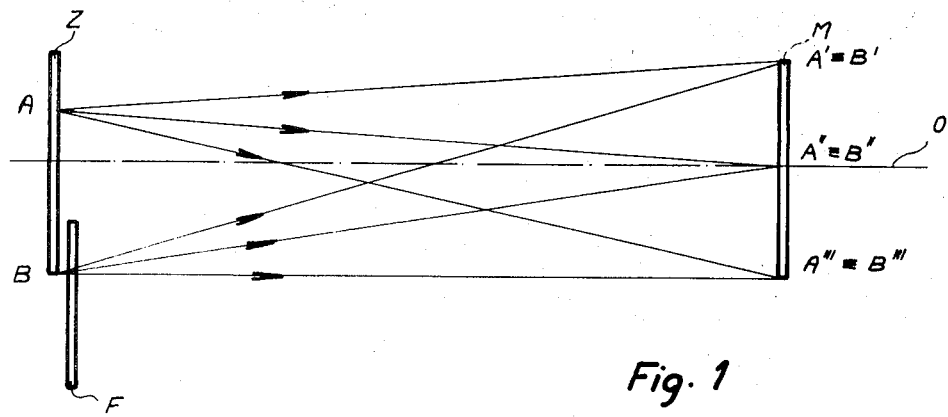
FIG. 1 illustrates the illuminating system of an enlarger with a surface light source.

As pointed out earlier it would be highly desirable to provide a system in which uniform distribution of light could be easily obtained and if a surface light source would be availabe of at least the same size as that of the color negative original. An example of such a system is illustrated in FIG. 1, from which it is obvious that the light rays coming from an arbitrary point, denoted for example by the letter $A$ or $B$ and lying on the surface of a light source $Z$, fall on the color original $M$ in points $A'$, $A''$, $A'''$ and $B'$, $B''$, $B'''$ respectively. It follows from this that the respective points A and B comprising the light source uniformly illuminates the entire surface of the color original $M$ when the original is placed at a sufficient distance from it. Should a filter $F$ be inserted in the path of the light rays from the source $Z$, then the light on the original $M$ will be correspondingly altered. This occurs whether by the additive or subtractive filtration system. If the filter $F$ is caused to be interposed partially in the light rays, i.e., only in front of the rays from point B, for example, then it follows that the light rays coming from point A are of the same color as that of the surface light Z, while the light rays coming from point B are affected by the introduced filter F. Notwithstanding this, since the rays of each point A and B are incident over the entire surface of the original M, even the affected color on point B illuminates the whole surface of the original M in the modified color. The overall color of the color original M can then be affected in whole or in part by the movement of the entire length of the color filter F, in front of the light source.

Figure 2:
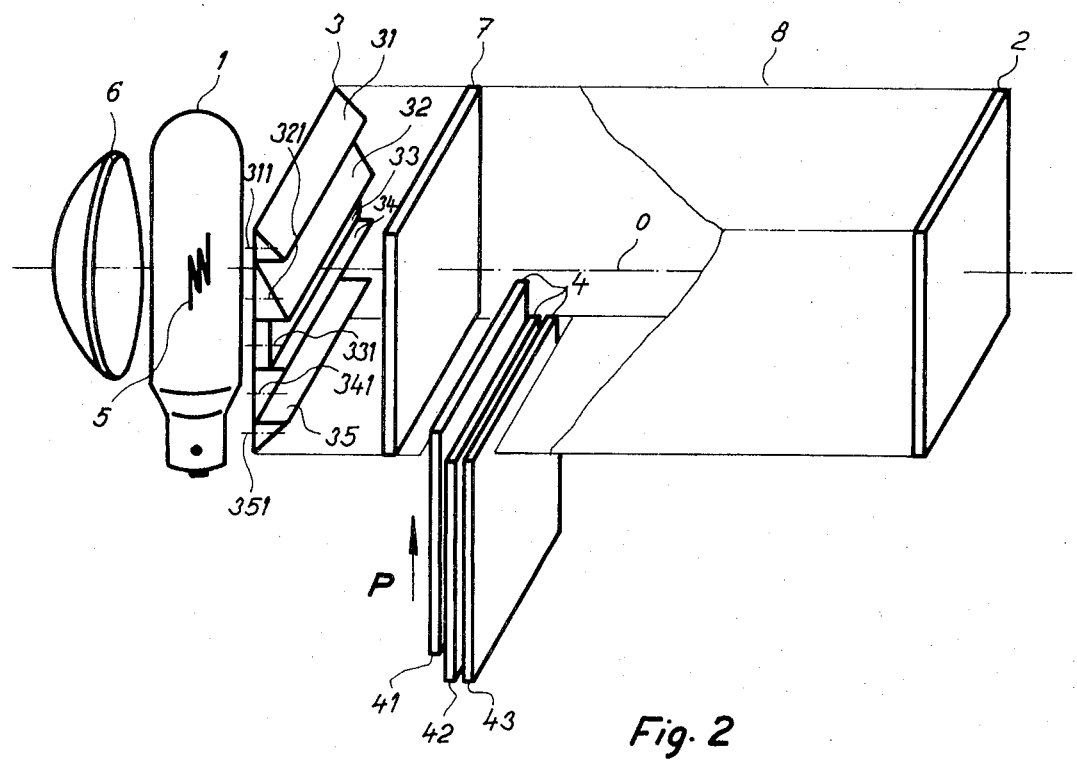
FIG. 2 illustrates the illuminating system with a dispersive optical member.

The structure for carrying out the illuminating system of the present invention is schematically seen in FIG. 2 in which the optical axis of the component parts is indicated by the horizontal broken line O. The apparatus comprises a source of light 1 adapted to provide ambient rays of determined intensity. The light source 1 comprises an incandescent or similar lamp mounted so that its filament center 5 lies along the optical axis O. Behind the lamp there is located a spherical concave reflecting mirror 6, although an aspherical mirror may also be used. Located in front of the lamp 1 is a compound dispersive optical lens assembly 3 adapted to divide the image of the filament into a plurality of corresponding images. In front of the lens system 3 is an input ground glass 7. Spaced from the glass 7 and parallel to it, a distance depending upon the refractive and focal characteristics of the lens assembly 3, is an output ground glass 2 against which the image to be reproduced is glasses. Between the plates 7 and 2 are located a plurality of filters 4 adapted to be selectively moved into and out of the path of the light rays between glasses 7 and 2.

By the present arrangement the output glass 2 or surface against which the color original can be placed is subjected to a plurality of multiple light ray sources derived from the use of a dispersive lens assembly 3, which, as later seen, is made up of a lens 33 and a plurality of prisms, the number of which is determined as a relationship to the height of input and output glasses 2 and 7 respectively. This multiple light source is further subjected to color moderation created by selectively inserting one or more filters between the input and output glasses. Since the entire surface of the output glass is affected by the insertion of one or more filters across the rays eminating from each of the prisms, the insertion of the filter or filters only partially affects the total color on the output glass. Total color moderation is effected by completely inserting the filters across the entire ray path.

The lens assembly 3 and the ground glass diffusing plates 2 and 7 are mounted within a rectangular box generally designated by numeral 8 having straight sides of suitable and conventional construction so as to be substantially light-tight. The ground glass plate adjacent the lens assembly comprises the input window through which the light rays eminating from the filament and passing through the lens assembly passes. The rays pass through the box to be incident upon the forward diffusing plate 2 which forms the output window of the system. The film negative or color original to be enlarged is adapted to be mounted in a frame or other suitable means adjacent the output glass 2 on the exterior side, so that the light passing through the glass 2 may be fully incident upon the negative or color original. Preferably the glasses 2 and 7 are of equal size.

The light source of lamp 1 and the filters may be housed in suitable means attached to the box to provide a cohesive unit. The filters are mounted to move into and out of the box 8 through a side wall. The rectangular box 8 of suitable and conventional construction is known per se and often referred to as a "mirror box" generally being a hollow rectangular tetrahedral body, the inner surface of which is brilliantly polished. The uses of such bodies or boxes for light mixing purposes are well known and suitably referred to as "light mixing bodies" or "light mixing boxes" and the filters can be mounted in any suitable manner to move into and out of the box 8 through a side wall thereof.

The dispersive lens assembly 3 is formed by a plurality of prisms or optical wedges 31 through 35 especially paired and placed in such a way that their optical axes 311 through 351 respectively are symmetrical and parallel to the central optical axis of the system as a whole, prisms 31 and 35 and 32 and 34 being respectively equidistant from the optical axis O. The middle situated prism 33 lies along the central optical axis O and has a zero refractive power. Preferably, it is formed by a plane parallel sided glass plate. The next adjacent or intermediate pair of prisms 32 and 34 have the same refractive power respectively, as to the respective outer prisms 31 and 35. The refractive power of the prisms 31, 32, and 34, 35 are chosen in a way that the rays eminating from the filament 5 of the lamp 1 are split and spread and diverge passing through each of the respective prisms to cooperatingly cover the entire surface of the output plate 2. Consequently, there is formed on the second plate 7 which is spaced closer to the lens 3 than the output glass 2, a number of images indentical to the filament 5 and in a plane parallel to the plane of the filament 5, which adjoin each other forming a light source of the size of the plate 7. Thus, the output plate 2 forms the real light source for the illumination of the image original or photographic negative, which is not illustrated in the drawings.

The beams of light rays coming from the filament 5 and augmented by the reflected rays from the mirror 6 pass through each of the prisms of the dispersive lens assembly 3 in such a way that after refraction by each prism, they fall collectively on the entire surface of the output ground glass 2. Therefore, the minimum number of prisms in the assemby 3 is to be determined as a multiple of the height of the output glass 2 relative to the height of the filament 5 less one since the central prism 33 lying along the optical axis is not to be taken in the determination of the minimum number. The relationship is stated as $S = m/v - 1$ where:

$S$ = the number of prisms
$m$ = the height of the input ground glass 7
$v$ = height of the filament 5

That is to say, in order to cover the output glass 2, the number of prisms are chosen, so that each has a refractive power capable of dispersing the light rays to a size equal to that of the glass 2. Thus, as will be obvious, a plurality of superimposed images of the light source are incident upon the ground glass output window 2, depending in number on the number of prisms used. These images are indeed likened to the several points A and B seen from FIG. 1.

The filters 4 comprise an assemblage of color correction filters. The filters 4 are mounted in conventional mounts to be movable in the direction of arrow P in a plane perpendicular to that of the central axis O and parallel to the input plate 7 and the output plate 2.

The system of color correction filters 4 is formed for example by separate filters 41, 42, and 43 which in the event the subtractive method of light filtration is employed, constitute a yellow, magenta, and cyan primary color respective. In an additive system other colors would be employed in the filters. Each filter is mounted so that its depth of movement into the path of the light rays can be individually adjusted and controlled. The filters can thus be selectively inserted, one or more at a time, to block or interfere with the light rays from one or more of the prisms in the assembly 3. In this manner it is possible to control the total color density of the light incident on the output window 2. That is, as the filters are moved into position in the path of each image from the lens assembly 3, the mixture of unfiltered and filtered rays changes and varies from zero filtration to 100% filtration, as is intended and seen in relation to FIG. 1.

The present invention is suitable for all types of enlargers for making color reproductions both by subtractive and additive method, the latter, however, requiring another series of color correction filters.

The advantage of the above system lies in the fact that the change in color of light is perceptivle even at a small movement of the respective color filter and that the density of color variation increases with successive movement of the color filter uniformly and in vertical linear progression. This is very important in designing indicating instruments, as the scale divisions, indicating the grade of color are nearly uniformly distributed along the entire length of the scale. Without the device according to the present invention the distances of the individual divisions at the beginning of the scale would be relatively large, which would make the orientation difficult. Another advantage is that the optical prisms with their relatively small dimensions intercept a large angle of light rays coming from the filament of the projection lamp and refract them into the mirror - box 8 which mixes the light completely.

Various changes, modivications and alterations can be made, all within the scope of the present invention. The disclosure is therefore intended to be illustrative only and not limiting of the invention claimed.

What is claimed is:

1. Apparatus for illuminating the object image in a color photo-enlarger comprising a source of light, a first ground glass aligned along the optical axis of said source for receiving said light to illuminate said image, a lens assembly interposed between said source and said ground glass, said lens assembly comprising a lens member lying along said optical axis and a plurality of optical wedges arranged in pairs symmetrical to the optical axis, the wedges in each pair having the same refractive power and lying equidistant from the optical axis, for dispersing said light source into a plurality of images incident upon said ground glass, and filter means movable between said lens assembly and said ground glass for selectively modifying the color of said images.

2. The apparatus according to claim 1 including a second ground glass arranged between the lens assembly and the filter means.

3. The apparatus according to claim 2 including a rectangular enclosure housing said filter means, the first and second ground glasses comprising the ends of said enclosure and forming input and output windows for said light source, said filter means being mounted to be selectively movable into and out of said enclosure in a plane parallel to said ground glasses and perpendicular to the optical axis.

4. The apparatus according to claim 1 wherein the number of optical wedges in said lens assembly is determined by the relation $$S = m/v - 1 \text{ where:}$$

$S$ = the number of prisms,
$m$ = height of the first diffusion plate, and
$v$ = the height of the filament of the projection lamp.

5. The apparatus according to claim 4 wherein the lens member at the center of the lens assembly is a plane glass with zero refractive power.

6. The apparatus according to claim 1 wherein the filter means comprises a plurality of filters selected for subtractive color values.

7. The apparatus according to claim 1 wherein the filter means comprises a plurality of filters selected for additive color values.

* * * * *